United States Patent [19]

Kirigaya

[11] Patent Number: 5,041,854
[45] Date of Patent: Aug. 20, 1991

[54] VIEW FINDER IN SINGLE-LENS REFLEX CAMERA

[75] Inventor: Tadayuki Kirigaya, Tokyo, Japan

[73] Assignee: Asahi Kogaku Kogyo Kabushiki Kaisha, Tokyo, Japan

[21] Appl. No.: 543,364

[22] Filed: Jun. 26, 1990

[30] Foreign Application Priority Data

Jul. 3, 1989 [JP] Japan ............... 1-78417[U]

[51] Int. Cl.⁵ ............................................. G03B 19/12
[52] U.S. Cl. .................................................. 354/155
[58] Field of Search .............................. 354/152, 155

[56] References Cited

U.S. PATENT DOCUMENTS 3,590,683 7/1971 Hiruma ........................ 354/155 X
3,620,147 11/1971 Ataka et al. ................. 354/155 X
4,206,991 6/1980 Kobori et al. ................ 354/155 X Primary Examiner—Michael L. Gellner
Attorney, Agent, or Firm—Sadler, Greenblum & Bernstein

[57] ABSTRACT

A view finder of a single-lens reflex camera is provided with an upper cover, in which an image of an object transmitted through a photographing lens is visible. The viewfinder image is reflected by a first mirror formed on a focusing plate, is made incident upon roof reflecting surfaces perpendicular to each other, and is made incident on a third reflecting surface, so as to be made incident upon a magnifying glass. The roof reflecting surfaces are formed directly onto the inner surface of the upper cover of the single-lens reflex camera. The third reflecting surface is a member which is separate from the upper cover and is adhered to the upper cover.

7 Claims, 2 Drawing Sheets

VIEW FINDER IN SINGLE-LENS REFLEX CAMERA

BACKGROUND OF THE INVENTION

1. Field of the Invention

The present invention relates to a view finder in a single-lens reflex camera.

2. Description of Related Art

In a known view finder of a single-lens reflex camera, as shown in FIG. 3, an image (light) of an object which is transmitted through a photographing lens is reflected by a quick return mirror (first mirror) to be formed on a focusing glass 1, so that the focused image is reflected by an upper roof reflecting surface 3 of a pentagonal roof prism 2 and a front third reflecting surface 4 thereof. Then, reflected light is incident upon a magnifying glass (eye piece) 5 to obtain an erect image. The pentagonal roof prism 2 is covered by an upper cover 6 which wholly covers an upper part of a camera body.

The pentagonal roof prism is, however, heavy and costly. Instead of such a heavy and expensive pentagonal roof prism, it is known to use a cavity type of pentagonal mirror, in which only portions corresponding to the roof reflecting surface and the third reflecting surface are made of reflecting mirrors, in a view finder. The cavity type pentagonal mirror, in which the reflecting surfaces of the prism are replaced with the reflecting mirrors, is lighter and less expensive than the pentagonal roof prism, since the pentagonal mirror is hollow, unlike the pentagonal roof prism which has of a glass body.

SUMMARY OF THE INVENTION

The primary object of the present invention is to provide a lighter and less expensive view finder has previously been used, in a single-lens reflex camera.

The inventor of the present invention has concentrated on the upper cover (upper decoration plate) which is inevitably provided in a single-lens reflex camera and which is substantially analogous in shape to a pentagonal roof prism, or a cavity type pentagonal mirror used to cover a pentagonal roof prism, or the cavity type pentagonal mirror, and has conceived a formation of the roof reflecting surfaces directly on the inner surface of the upper cover.

Namely, according to the present invention, a view finder of a single-lens reflex camera is provided with an upper cover, in which an image of an object transmitted through a photographing lens and reflected by a first mirror to be formed on a focusing plate is made incident upon roof reflecting surfaces perpendicular to each other, and upon a third reflecting surface to be made incident upon a magnifying glass, wherein the roof reflecting surfaces are formed directly on the inner surface of the upper cover of the single-lens reflex camera.

With this arrangement, since the roof reflecting surfaces are formed directly on the upper cover without using the conventional pentagonal roof prism or the conventional cavity type pentagonal mirror, a lower number of components, and a lower number of assembly steps are necessary, thus resulting in a less expensive and lighter single-lens reflex camera. Futhermore, since the contour of the product (camera) is the same as that of the conventional pentagonal prism or the conventional cavity type pentagonal mirror, the camera can be minimized. Namely, the upper cover of the present invention corresponds to the conventional pentagonal roof prism or the conventional cavity type pentagonal mirror, and accordingly, the camera can be made smaller and lighter.

BRIEF DESCRIPTION OF THE DRAWINGS

The invention will be described below in detail with reference to the accompanying drawings, in which.

DETAILED DESCRIPTION OF PREFERRED EMBODIMENT

Figure 1:
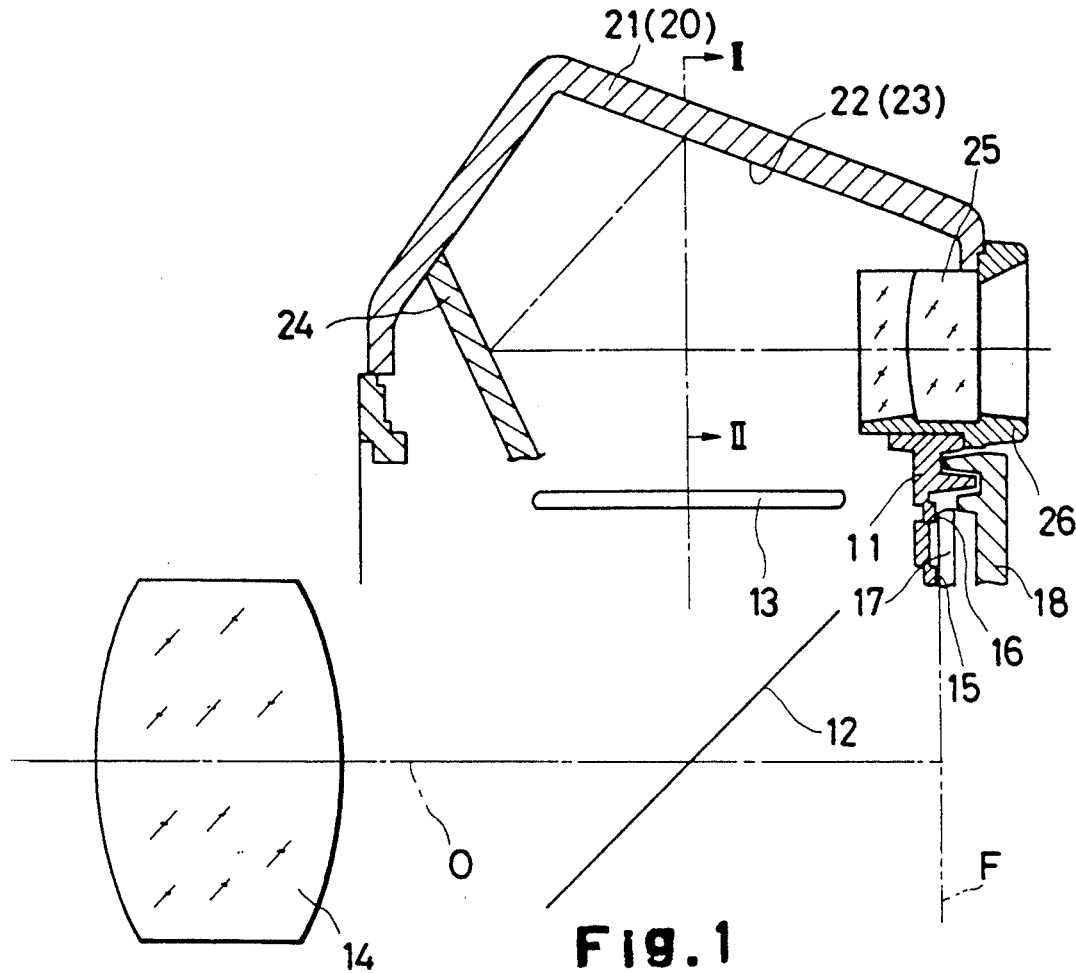
FIG. 1 is a longitudinal sectional view of a view finder of a single-lens reflex camera, according to the present invention.
Figure 2:
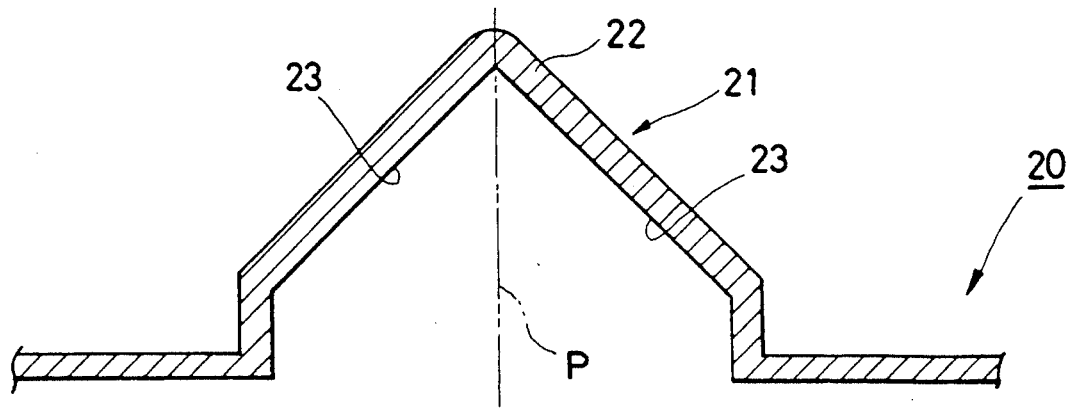
FIG. 2 is a sectional view taken along the line II—II in FIG. 1.

In a camera body 11, a quick return mirror 12 and a focusing plate (glass) 13 are provided, as is well known. An image of an object to be taken is transmitted through a photographing lens 14 and is reflected by the quick return mirror 12 to be formed on the focusing glass 13 which is located at a position which is optically equivalent to a film plane F. The film is advanced in a film tunnel defined by and between an inner rail 15 formed on the camera body 11 and a pressure plate 17 which comes into contact with an outer rail 16. The pressure plate 17 is provided on a back cover 18.

In the present invention, the roof reflecting surfaces are formed directly on the inner surface of the upper cover (upper decoration plate) 20, so that an object image formed on the focusing glass 13 can be viewed as an erect image through the finder, instead of using the conventional pentagonal roof prism or the conventional cavity type pentagonal mirror. Namely, the upper cover 20 secured to the camera body 11 is provided near the center portion thereof with a convex projection 21 which upwardly projects. The projection 21 is provided on its inner surface with a ridge 22 which is located on a vertical plane P intersecting the optical axis 0 of the photographing lens 14. On the opposite sides of the ridges 22 are symmetrically provided a pair of roof reflecting surfaces 23 which form 90° therebetween. The ridge 22 and the roof reflecting surfaces 23 are inclined at a predetermined inclination angle with respect to the focusing glass 13 in the forward and backward directions of the camera. The roof reflecting surfaces 23 can be made of a reflecting layer which is formed, for example, by a vacuum evaporation on the inner surface of the upper cover 20 which is made, for example, of plastics.

A third reflecting mirror 24 is formed as a third reflecting surface, in addition to the quick return mirror 12 and the roof reflecting surfaces 23 is provided in the upper cover 20. The reflecting mirror 24 is secured to the inner surface of the upper cover 20 at a predetermined inclination angle with respect to the roof reflecting surfaces 23 and the magnifying glass 25 so as to reflect an object image which is reflected by the roof reflecting surfaces 23, so that the object image can be made incident upon the magnifying glass (lens) 25. The reflecting mirror 24 is made, for example, of a plastic material which is coated with a reflecting layer formed by, for example, vacuum evaporation or deposition. The reflecting mirror 24 is secured to the inner surface of the upper cover 20 for example by an adhesive. The magnifying glass (eye piece) 25 is supported by a lens frame 26 which is secured to the camera body 11.

Figure 3:
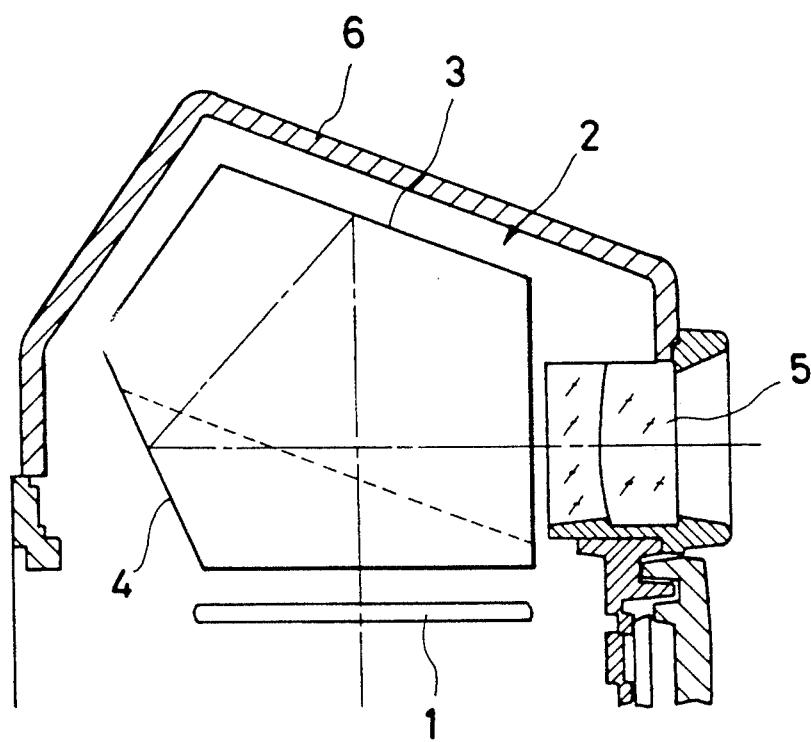
FIG. 3 is a longitudinal sectional view of a knwon view finder having a pentagonal prism incorporated therein.

The roof reflecting surfaces 23 and the reflecting mirror 24 correspond to the roof reflecting surfaces 3 of the conventional pentagonal roof prism or the conventional cavity type pentagonal roof mirror and the third reflecting surface 4, shown in FIG. 3, respectively.

In the view finder as constructed above, according to the present invention, the object image which is formed on the focusing glass 13 can be viewed as an erect image through the roof reflecting surfaces 23 and the reflecting mirror 24 and the magnifying glass 25, similarly to the result in a conventional arrangement, in which the pentagonal roof prism or a cavity type pentagonal roof mirror is used.

I claim:

1. A view finder for use in a single-lens reflex camera with an outer upper cover which covers a top of a camera body, in which an image of an object transmitted through a photographing lens and reflected by a first mirror to be formed on a focusing plate is made incident upon roof reflecting surfaces perpendicular to each other, and upon a third reflecting surface, so as to be made incident upon a magnifying glass, wherein the roof reflecting surfaces are formed directly on the inner surface of the upper cover of the single-lens reflex camera, and wherein said third reflecting surface comprises a reflecting mirror which is separate from and secured to said inner surface of said upper cover.

2. A view finder according to claim 1, wherein said roof reflecting surfaces comprise vacuum-evaporation layers formed on the inner surface of the upper cover.

3. A view finder according to claim 2, wherein said upper cover is made of plastic.

4. A view finder of a single-lens reflex camera having a camera body to which a photographing lens is attached, said view finder comprising:

a focusing plate on which a focused image of an object to be taken is formed by the photographing lens;

an eye-piece through which the object image on said focusing plate can be viewed;

an outer upper cover which is provided on an upper portion of the camera body and which is provided, on its inner surface, with a ridge located on a vertical plane intersecting an optical axis of the photographing lens, said ridge inclined at the predetermined inclination angle in the forward and backward directions of the camera, and roof reflecting surfaces symmetrically formed on the opposite sides of said ridge at a right angle to each other and a third reflecting surface provided on said upper cover wherein said third reflecting surface is a member separate from said upper cover and wherein said third reflecting surface is adhered to said upper cover.

said roof reflecting surfaces and said third reflecting surface positioned to have an angular relationship so that an object image formed on said focusing plate is made incident upon said eye-piece inverted in the vertical and horizontal directions, whereby an erect image can be viewed through said eye-piece.

5. A view finder according to claim 4, wherein said upper cover and said third reflecting surface are made of plastic.

6. A view finder according to claim 5, wherein said upper cover and said third reflecting surface include vacuum-evaporation layers formed on said plastic.

7. A view finder of a single-lens reflex camera having first and second roof reflecting surfaces connected to each other at a right angle, and a third reflecting surface, to make an object image formed on a focusing plate of the camera incident upon an eye-piece as an image inverted in the vertical and horizontal directions, said view finder comprising an outer upper cover which is provided on an upper portion of the camera and which has an upwardly projecting convex projection, so that the roof reflecting surfaces are formed directly on the inner surface of said upper cover, and wherein said third reflecting surface is a member separate from said upper cover and is adhered to said upper cover.

* * * * *

UNITED STATES PATENT AND TRADEMARK OFFICE
CERTIFICATE OF CORRECTION

PATENT NO. : 5,041,854
DATED : August 20, 1991
INVENTOR(S) : T. KIRIGAYA

It is certified that error appears in the above-indentified patent and that said Letters Patent is hereby corrected as shown below:

On title page, item [56], insert ---4,171,888 10/1979 Shono et al. 354/155---.
On title page, item [56], insert ---4,589,023 5/1986 Suzuki et al. 358/213---.
On title page, item [56], insert ---4,289,392 9/1981 Kobori et al. 354/225---.
On title page, item [56], insert ---4,212,526 7/1080 Yamazaki et al. 354/225---.
At column 4, line 11 (claim 4, line 17), change "other and" to ---other;---.
At column 4, line 16 (claim 4, line 22), change "cover." to ---cover; and---.

Signed and Sealed this

Third Day of May, 1994

Attest:

BRUCE LEHMAN

Attesting Officer

Commissioner of Patents and Trademarks